March 7, 1967 G. G. HACKER ET AL 3,307,382
DIGITALLY CONTROLLED RANDOM ACCESS MEANS
Filed Sept. 21, 1964 6 Sheets-Sheet 1

INVENTORS
GEORGE GORDON HACKER
and JOHN G. LUKER

BY Garrett, Bell, Seltzer, Park & Heard
ATTORNEYS

March 7, 1967     G. G. HACKER ET AL     3,307,382
DIGITALLY CONTROLLED RANDOM ACCESS MEANS
Filed Sept. 21, 1964                         6 Sheets-Sheet 2

INVENTORS:
GEORGE GORDON HACKER
and JOHN G. LUKER

BY Barrett, Bell, Seltzer, Park & Heard

ATTORNEYS

March 7, 1967 G. G. HACKER ET AL 3,307,382
DIGITALLY CONTROLLED RANDOM ACCESS MEANS
Filed Sept. 21, 1964 6 Sheets-Sheet 6

INVENTORS:
GEORGE GORDON HACKER
and JOHN G. LUKER
BY Parrott, Bell, Seltzer, Park & Heard
ATTORNEYS United States Patent Office 3,307,382
Patented Mar. 7, 1967

3,307,382
DIGITALLY CONTROLLED RANDOM
ACCESS MEANS
George Gordon Hacker and John G. Luker, Stanley, N.C.,
assignors to Gaston County Dyeing Machine Company, Stanley, N.C., a corporation of North Carolina
Filed Sept. 21, 1964, Ser. No. 397,891
12 Claims. (Cl. 68—12)

This invention relates to a random access means for a movable programmer and more specifically to a random access means for controlling and moving a programmer to control the sequence of cycles actuated by the programmer independently of the sequence of arrangement of such cycles on the programmer.

In controlling the sequence of cycles or steps in any operation which requires various cycles to be performed, it is desirable to program these cycles in the sequence desired on some automatic programmer to eliminate the necessity of constant vigilance and manual actuation by an operator of the various components necessary to perform the individual cycles.

Heretofore, electro-mechanical programmers have been available in the form of movable memory drums, etc. with physical indicia thereon for cooperation with a group of switches to actuate the various cycles in a desired operation. These programmers were normally movable sequentially to actuate the succeeding cycles in predetermined timed intervals according to the operation being performed. While these types of programmers substantially automated the operation and eliminated much of the required attention by an operator, they presented the problems of lack of flexibility in that any change in the sequence required complete reprogramming and it was not possible to obtain repeats of certain cycles without individually programming each repeat in sequence. For example, if a particular operation required a plurality of cycles, certain of which were repeated a number of times during the operation at various points in the sequence thereof, it was necessary to program the same cycle on these programmers each time it was to be performed in the sequence inasmuch as these prior programmers were only adapted to move sequentially from one cycle to another without being able to interrupt the sequence set up thereon to return to a previously programmed cycle if that particular cycle was to be repeated. Therefore, these prior sequentially operated programmers lacked flexibility in changing from one operation to another which would require different sequences of the same cycles in various operations. As a consequence, a particular programmer could only be used for one operation.

Automatic programming has found wide utility in various machine and manufacturing operations wherein it is desired to initiate a plurality of different cycles performing different functions in the machine and manufacturing operation. One example of such a machine and manufacturing operation is in the dyeing of textile materials.

In the dyeing of textile materials with a dyeing machine, various machine cycles, such as filling top washing, draining, steaming, adding dyeing material, diluting, etc., are necessary. Each of these cycles require the actuation of various components, such as valves, controls, steam lines, etc. In adapting one of the above-discussed programmers to a textile dyeing machine, each of the above cycles had to be programmed on the programmer to actuate the necessary valves, controls, etc. in the sequence in which they were to be performed for a particular textile material and dyeing process. This necessarily required the programming of certain cycles, such as filling, draining, etc., a number of times for each dyeing operation because it was necessary to use these cycles a number of times and the programmer, because of its sequential movement, could not return to a previously programmed cycle once that particular cycle had been performed.

Therefore, the need arose for the provision of a random access means for controlling and moving the programmer to control the sequence of cycles actuated by the programmer independently of the sequence contained on the programmer. This would make possible the programming of all of the cycles which could possibly be used in the machine operation on the programmer without regard to sequence because the random access means would set up the sequence for a particular operation. An approach to this problem has been made in the electronic field in computors and the like with the use of electronic or magnetic tape and complex switching circuits. However, these arrangements do not lend themselves to acceptability in many manufacturing operations because of the complexity of operation, complexity of programming, and complexity of repairing which would have to be performed by the ordinary technicians and operators in a manufacturing plant who are not skilled in the electronic know-how which would be required.

With this in mind, it is an object of this invention to provide a simple electro-mechanical random access means for controlling and moving an electro-mechanical programmer to control the sequence of cycles actuated by the programmer independently of the sequence of arrangement on the programmer.

A further object of this invention is to provide a random access means for controlling the movement and sequence of cycles actuated by a programmer which may be easily programmed, operated and repaired.

It is a further object of this invention to provide a random access means for controlling the movement and sequence of cycles actuated by a programmer which can be easily changed to change the sequence of cycles actuated by the programmer to provide flexibility for various machine operations.

A further object of this invention is to provide a random access means for controlling a programmer whereby all of the cycles that could possibly be used in a machine operation could be programmed on the programmer without regard to sequence and whereby the random access means would control the desired sequence and number of cycles for a particular operation.

It is a more specific object of this invention to provide a random access means for controlling the movement and sequence of cycles actuated by a programmer to control the operation of a dyeing machine so that the dyeing machine may be easily and quickly adapted to perform the desired cycles in the dyeing of any type of textile material and dyeing process.

Some of the objects of the invention having been stated, other objects will appear as the description proceeds, when taken in connection with the accompanying drawings, in which—

Figure 1:
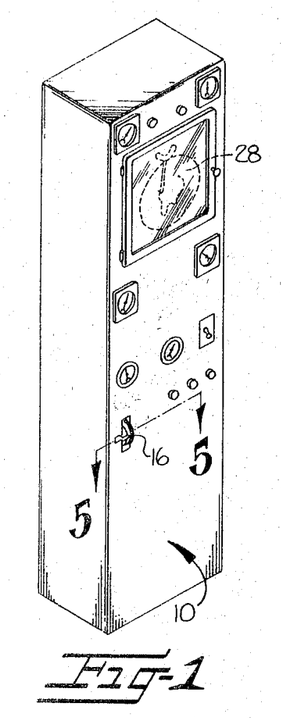
FIGURE 1 is a perspective view of the control cabinet housing the random access means of this invention.

Referring now to the drawings, a control cabinet, generally indicated by the reference numeral 10, is shown in FIGURE 1. Contained within the control cabinet 10 is a programmer illustrated in the form of an elongate cylindrical drum 11 (FIGURES 5 and 6) but which could be of any desired shape or configuration. The programmer drum 11 is rotatably supported by bearings 12 and 13 on plates 14 and 15 secured to the control cabinet 10. For rotating the programmer drum 11, there is provided a gear 16 secured to the shaft of the programmer drum 11. The gear 16 intermeshes with a gear 17 on a shaft 20 from the motor 21 so that when the motor 21 is operating, in a manner to be described, the gear 17 will rotate to rotate gear 16 to rotate programmer drum 11.

The programmer drum 11 has a plurality of longitudinal rows of apertures 22. For purpose of illustration in this application, the programmer drum 11 is shown to have 25 of these longitudinal rows of apertures 22, as may be seen in FIGURE 9. However, it is to be understood that the programmer drum may be of any size to contain any number of longitudinal rows as will be dictated by the particular machine operation contemplated. These apertures 22 also form circumferential rows and as illustrated in this application there are provided 31 of these circumferential rows. As viewed in FIGURES 5 and 9, these circumferential rows are divided into two groups, a first group of 26 rows as in a conventional programmer and a second group of 5 rows forming part of the random access means of this invention, for purposes to be hereinafter described. The apertures 22 are adapted to receive physical indicia 23 and as illustrated these physical indicia are in the form of removable projections known as pips. However, it is to be understood that these physical indicia could be of any physical form capable of actuating corresponding or mating physical indicia such as holes, projections, depressions, etc. other than electrical or magnetic tape.

The programmer and random access means can be used to control various types of machine operations and is particularly useful in controlling machines for the treatment of textile fibers, yarns and fabrics. These machines are generally referred to as dyeing machines although they may be used for a variety of textile treatment purposes such as, dyeing, washing, drying, steaming, application of various chemicals such as resins and finishes, bleaching, thermal treatment such as heat-setting and the like. The term dyeing machine as used in the specification and claims is meant to include machines capable of carrying out the foregoing textile operations. For purposes of illustration, the invention will be described herein in association with a conventional package yarn pressure dyeing machine, capable of performing many of the above named functions generally indicated by the reference numeral 24 and shown diagrammatically in FIGURE 8.

A dyeing machine of this type may include a kier for handling packages of yarn or the like to be dyed, suitable tanks such as chemical tanks and dye mix tanks for supplying dyestuffs and other chemicals in predetermined amounts at predetermined times under predetermined pressure to the kier. The dyeing machine also includes an expansion tank, and suitable lines connecting the various components and a pump for causing circulation of steam, water, dyestuffs, etc. through the lines as may be desired for a particular operation. Suitable valves and controls are provided in association with the various tanks and lines to permit flow of materials, circulation, drain, etc. as may be desired in carrying out a particular sequence of operations in a complete dyeing operation. The valves and controls may be actuated in any desired manner to permit control of the operations and programming of the cycles or operations in any desired sequence. Since the operation of this type of dyeing machine is well understood by those in the dyeing machine art, a more detailed explanation of the dyeing machine components is deemed unnecessary, except insofar as reference will hereinafter be made to the manner of controlling the particular valves and controls in accordance with this invention.

In utilizing the programmer drum 11 for controlling the dyeing machine 24, the longitudinal rows of apertures 22 on the programmer drum 11 are used to program each of the 25 possible cycles in the dyeing machine operation and the first group of 26 circumferential rows of apertures 22 are used to program each component necessary in any of the cycles represented by the longitudinal rows of apertures.

Figure 8:
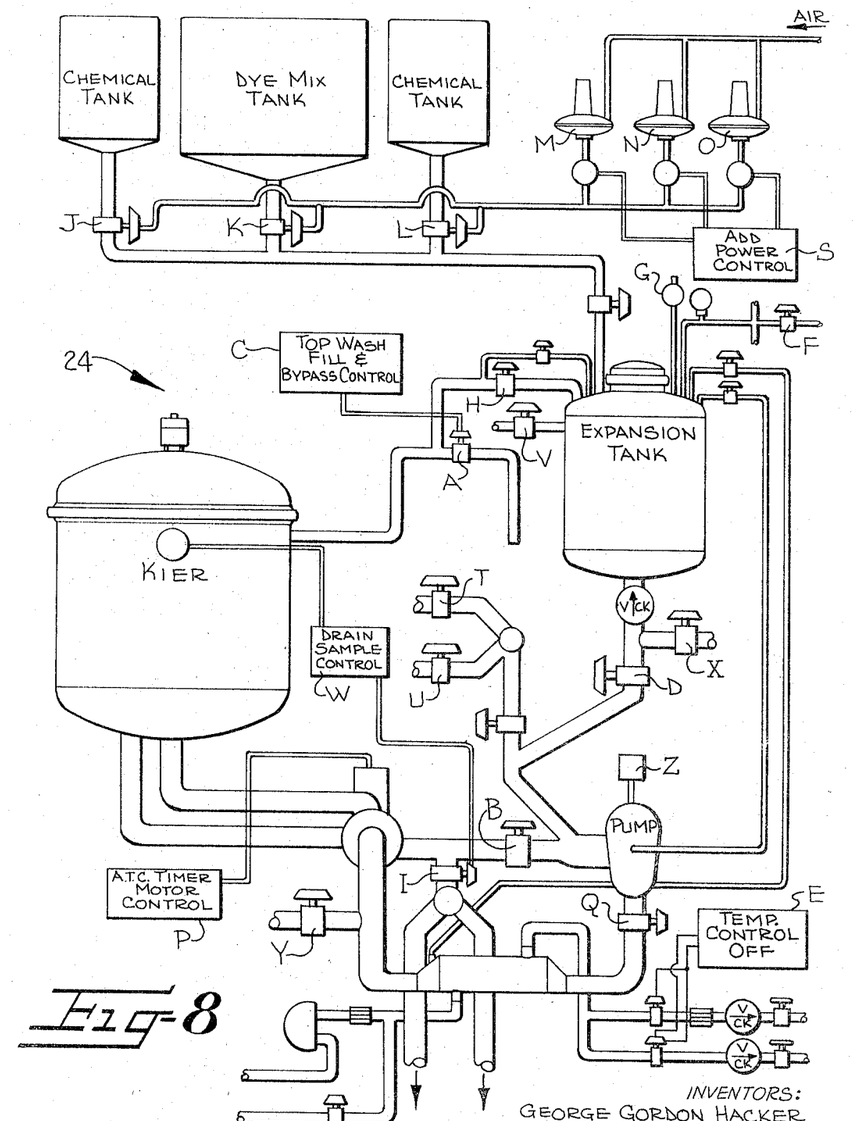
FIGURE 8 is a diagrammatic view of a typical dyeing machine to which this invention may be applied.

Thus to set up the programmer drum 11, it is necessary to place a physical indicium 23 in the aperture 22 across each longitudinal row of apertures in the circumferential row corresponding to each of the components desired to be actuated for that particular cycle. As may be seen in FIGURE 9, the longitudinal rows of apertures 22 are labeled to represent all of the cycles which the dyeing machine 24 is capable of performing. Each of these cycles requires the setting up of the desired performance of the components represented in FIGURE 9 by the circumferential rows of apertures 22 and labeled thereon. These valves and controls are normally either on or off or open or closed. It is desired to change some of these conditions for a particular cycle, then a physical indicium must be placed in the corresponding aperture for changing the valves and controls from their normal set up. If it is not desired to change some of these conditions, then the corresponding apertures will be left open. For example, in the dyeing machine 24, the fill cycle requires the opening of the kier overflow valve which is normally closed and the stopping of the ATC timer motor control, and the top wash cycle requires starting of the top wash and fill bypass control which is normally stopped and the starting of the in-out water control which is normally stopped. Therefore, physical indicia must be placed in these corresponding apertures. The necessary component changes for the remaining cycles may be easily seen in FIGURE 9. The components listed in FIGURE 9 opposite each circumferential row of apertures are represented by the reference characters A through Z and the corresponding valves, controls, etc. of the dyeing machine 24 are shown in FIGURE 8 by the reference characters A through Z. As pointed out above, the functions of these components in the various cycles of the dyeing machine operation are well understood by those with skill in the dyeing machine art and will not be discussed here.

Figure 5:
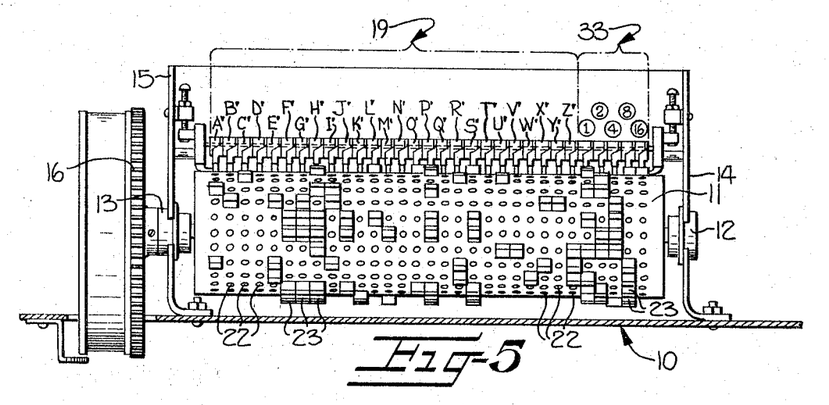
FIGURE 5 is a view taken substantially along the line 5—5 of FIGURE 1 and illustrating the programmer utilized in this invention.
Figures 6, 7:
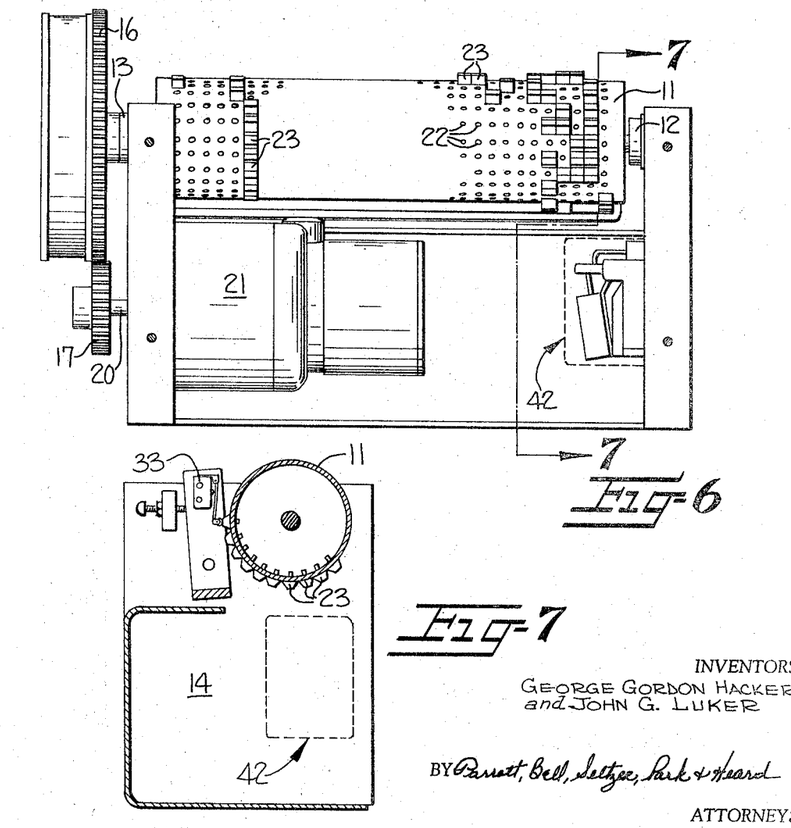
FIGURE 6 is a front elevational view of the apparatus shown in FIGURE 5.
FIGURE 7 is a cross-sectional view taken substantially along the line 7—7 of FIGURE 6.

For cooperation with the movable programmer drum 11 there is provided a bank of 26 switches, generally indicated by the reference numeral 19 and individually represented by the reference characters A' through Z', as may be seen in FIGURE 5. These switches A' through Z' are operatively connected to each of the valves, controls, etc. A through Z of the dyeing machine 24 to cause operation of such valves, controls, etc. by electric, hydraulic, air or other means in a known manner. The switches A' through Z' are adapted to be operated by the physical indicia 23 on the programmer drum 11 as the drum rotates to initiate a particular cycle in the operation of the dyeing machine.

In order to obtain operation of the cycles programmed on the programmer drum 11, and for moving the programmer drum 11 to locate the longitudinally rows of indicia 23 in operative engagement with the switches A' through Z' to actuate the components A through Z of the dyeing machine 24 in the sequence programmed to perform the particular cycle or in a sequence other than the sequence set up on the programmer drum 11, random access means is provided.

Figure 2:
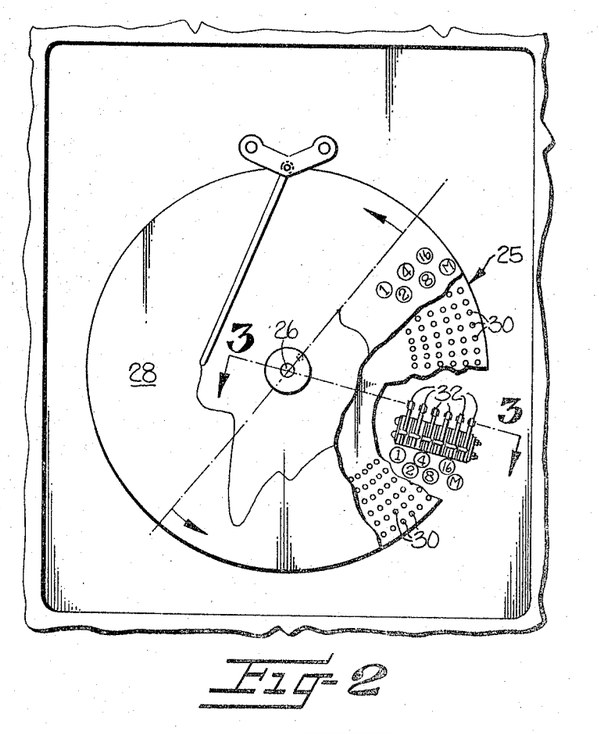
FIGURE 2 is an enlarged view broken away of the upper portion of the control cabinet of FIGURE 1 illustrating the location and mounting of part of the random access means of this invention.
Figures 3, 4:
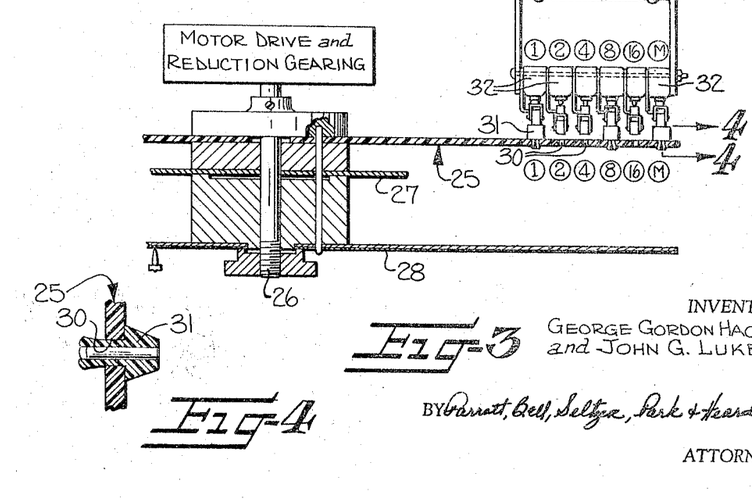
FIGURE 3 is a cross-sectional view taken substantially along the line 3—3 of FIGURE 2.
FIGURE 4 is a cross-sectional view taken substantially along the line 4—4 of FIGURE 3.
Figure 10:
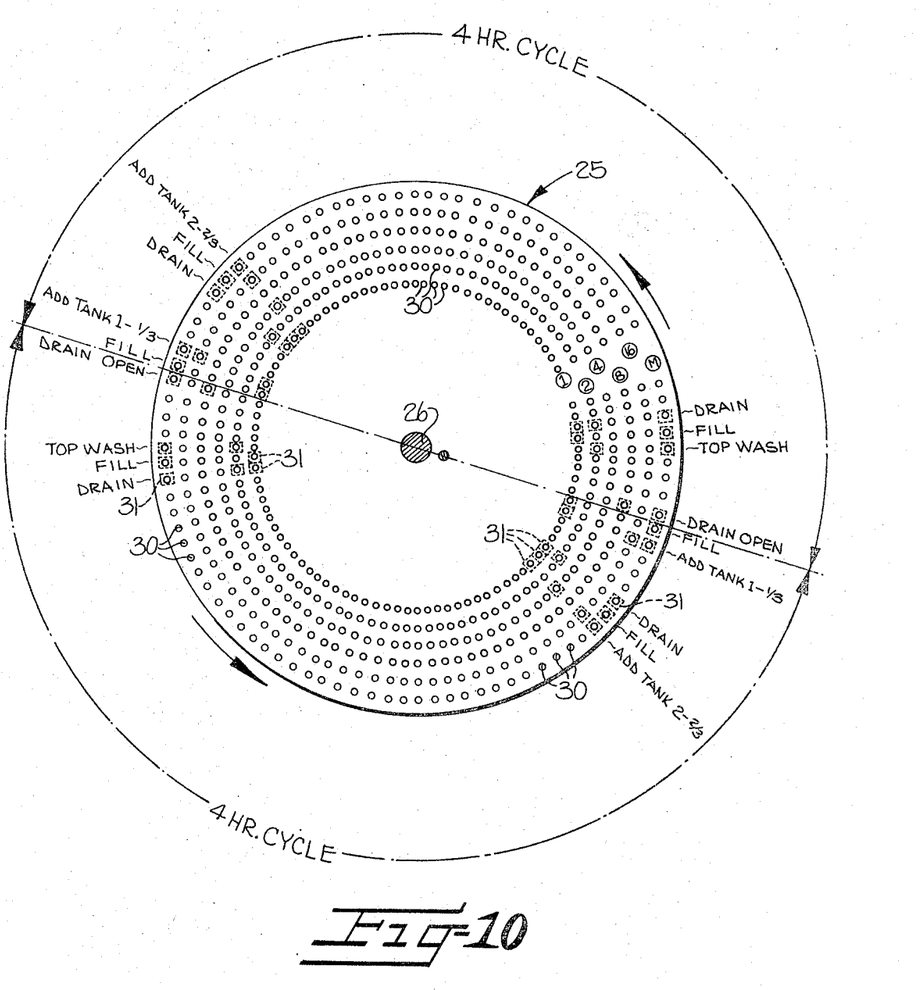
FIGURE 10 is a plan view of the movable disc constituting part of the random access means of this invention and being programmed for a typical sequence of cycles in the operation of the dyeing machine of FIGURE 8.

The random access means includes movable means illustrated in the form of a circular disc 25, as shown in FIGURES 2, 3 and 10. The circular disc 25 is rotatably mounted on a rotating shaft 26 driven in timed relationship by a motor drive and reduction gearing unit (not shown). The shaft 26 also carries a temperature cam 27 and a temperature chart 28, as shown in FIGURES 1, 2 and 3. The operation of a temperature cam and temperature chart of this type is well understood by those with ordinary skill in the art and will not be explained in detail herein, the operation being to control and record the temperature in the kier of the dyeing machine 24 in accordance with the curvature of the temperature cam. The shaft 26 of the particular temperature mechanism illustrated is adapted to make one complete revolution every eight hours and thus control the temperature in the kier for the eight hour period of a dyeing operation. It is to be understood that the random access disc of this invention could be mounted on any drive means which would rotate same in timed relationship for the desired length of time for a particular machine operation.

The random access disc 25 includes radial rows of apertures 30 which are adapted to receive physical indicia 31 in any physical form other than magnetic or electronic tape, such as pips, depressions, holes, projections, depressions, etc. The physical indicia is illustrated in the drawings in the form of pips, as may be seen in FIGURE 4. Each of the radial lines of apertures represent a binary code and, as arranged in the drawings, the first aperture in each radial row starting from the center of the disc to the outer periphery represent the respective digits 1, 2, 4, 8 and 16. The sixth aperture is the master control aperture which will be described more fully hereinafter. Any desired number of digits may be used in accordance with the number of cycles to be controlled.

Cooperating with the random access disc 25 is a group of six switches, generally indicated by the reference numeral 32. The switches 32 are mounted stationary on the control cabinet 10 and are adapted to be engaged by the physical indicia 31 on the random access disc 25 as the random access disc 25 rotates in timed relationship thereto. The switches 32 also represent the respective digits 1, 2, 4, 8 and 16 and a master control switch and are electrically connected through means to be hereinafter described to the motor 21 which drives the programmer drum 11. The random access means further comprises a group of five switches, generally indicated by the reference numeral 33, mounted adjacent the previously described bank of switches 19 for cooperation with the programmer drum 11. These five switches similarly represent the digits 1, 2, 4, 8 and 16 from left to right as viewed in FIGURE 5 and as labeled on that figure. These switches 33 are adapted to be operated by the physical indicia 23 contained in the last five circumferential rows of aperatures 22 on the programmer drum 11. The five switches 33 are electrically connected with the motor 21 by means to be hereinafter described to be adapted to stop the operation of the motor for initiation of a particular cycle. Thus it may be seen, that the random access disc 25 will control the movement of the programmer drum 11 through the previously described drive mechanisms. The switches 33 and cooperating physical indicia 23 have been described and illustrated as being associated with and forming part of the programmer drum 11; however, it is to be understood that these switches and indicia could be of any physical form separate or a part of the programmer drum 11 which would perform the aforementioned functions.

Figure 9:
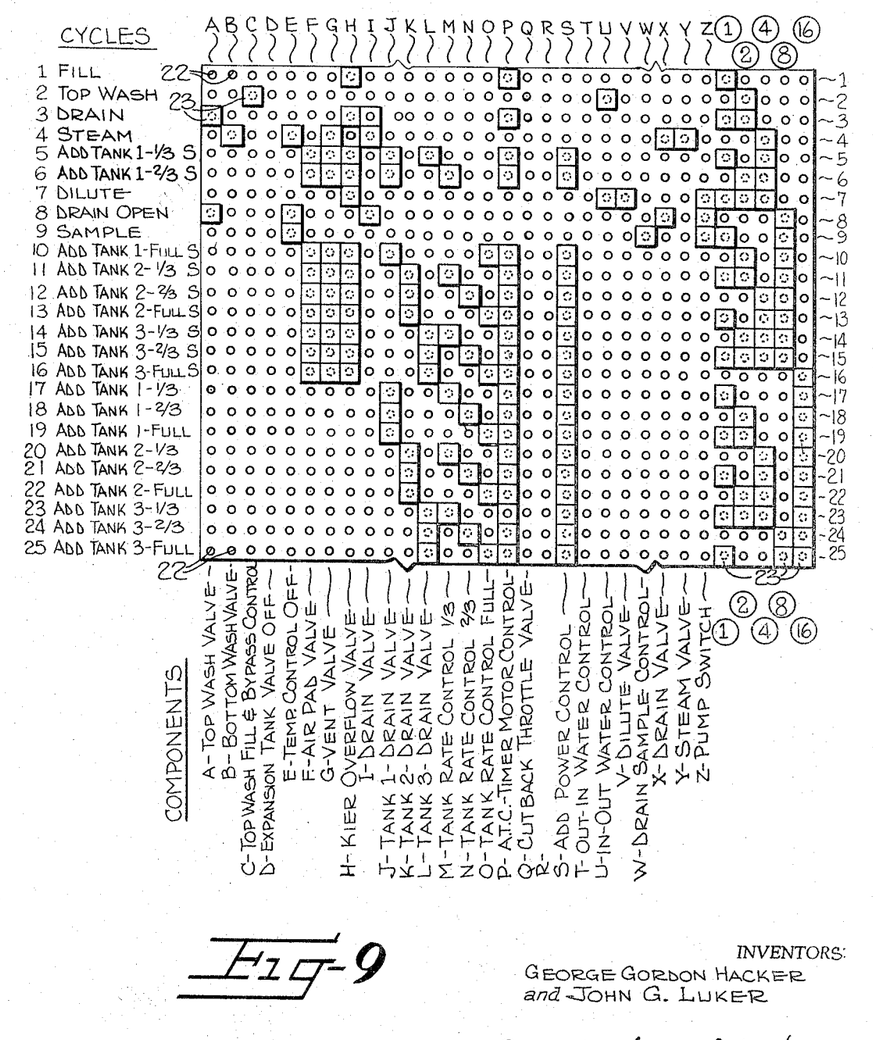
FIGURE 9 is a diagrammatic view representing the periphery of the programmer utilized in this invention and showing the manner in which it may be set up to actuate the various cycles in the dyeing machine of FIGURE 8.

As may be seen in FIGURE 9, each of the cycles programmed on the longitudinal rows of the programmer drum 11 are represented by a number 1 through 25. Therefore, if a particular cycle, for example cycle 9, was to be initiated, a physical indicium would be placed in a radial line on the disc 25 in the aperture represented by the digit 1 and in the aperture represented by the digit 8 on the random access disc 25 to equal the sum of 9 for cycle 9. Also, a physical indicium would be placed in the master control aperture for purposes to be hereinafter described. When these indicia engage the corresponding switches 32, as may be seen in FIGURE 3, the operation of the motor 21 would begin, through the electrical connection to be hereinafter described, to start rotation of the programmer drum 11. The motor would continue operating until the longitudinal row, corresponding to cycle 9 on the programmer drum, came into juxtaposition with the component switches 19 and with the random access switches 33. It is noted that this longitudinal row would have physical indicia in the last five apertures corresponding to the digits 1 and 8 which would contact the appropriate switches 33 to stop operation of the motor and thereby stop movement of the programmer drum 11. At the same time, the physical indicia 23 in the longitudinal row corresponding to cycle 9 will contact the switches 19 to initiate operation of cycle 9.

This operation would be repeated in timed intervals for each of the desired cycles in a particular dyeing operation according to the rotation of random access disc 25. Any number of the available cycles may be programmed on the disc 25 in the particular sequence desired for a particular dyeing operation of the dyeing machine 24. In order to vary or change the sequence of operation, it is not necessary to change or reprogram the indicia on the drum 11, as the operator can effect any desired change by simply changing the indicia 31 on the disc 25.

Figure 11:
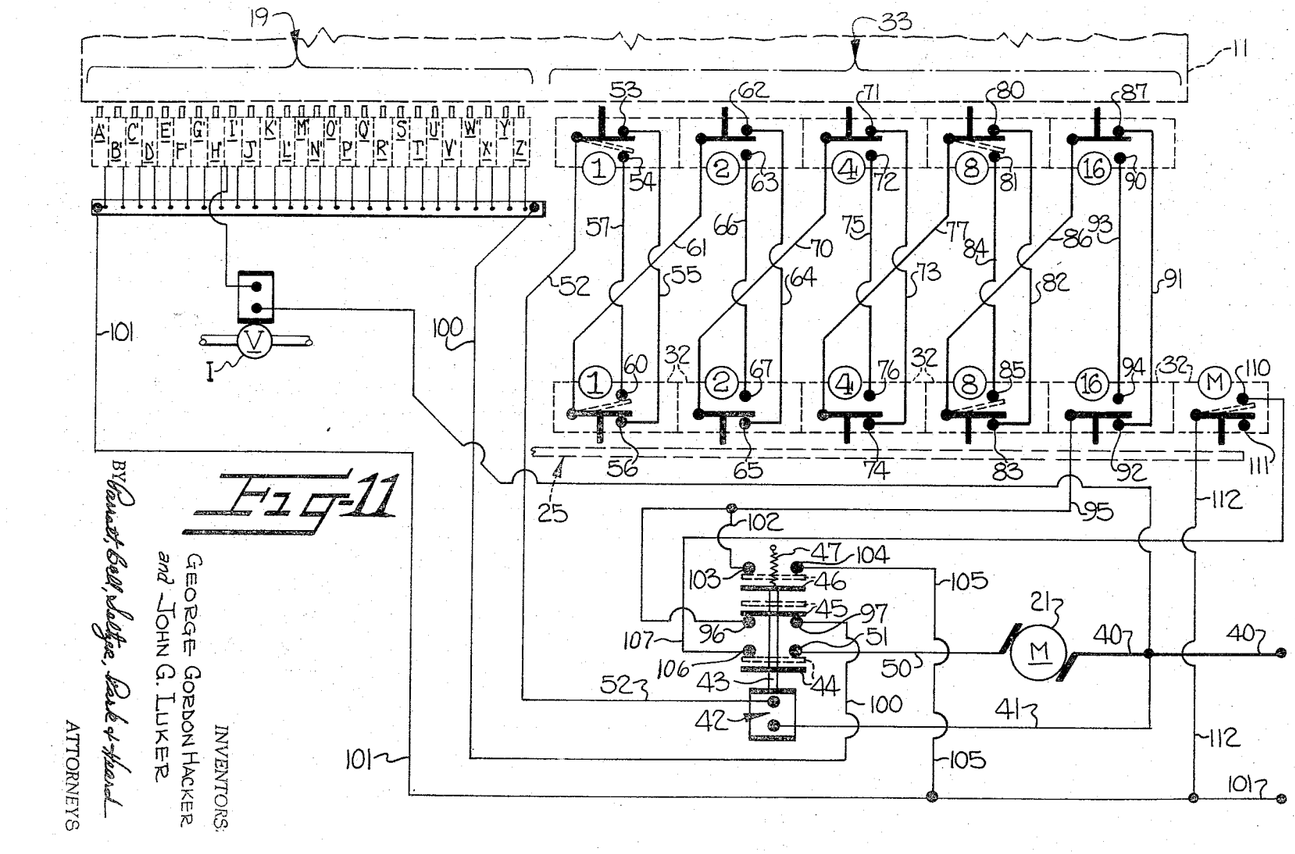
FIGURE 11 is a schematic wiring diagram illustrating the electrical connections between the random access means and the programmer of this invention.

The wiring diagram and electrical interconnections for the random access means may be seen in FIGURE 11. As seen in that figure, a line 40 is shown leading from any convenient power source (not shown) to one side of the motor 21. A line 41 is connected to the line 40 and leads to a solenoid relay 42. The solenoid 42 includes a movable shaft 43 having contact bars 44, 45 and 46 thereon. The shaft 43 and the contact bars 44, 45 and 46 are normally maintained in a lower position, shown in solid line in FIGURE 11, when the solenoid relay 43 is energized. A spring 47 is shown connected to the end of the shaft 43 for biasing the shaft and contact bars to an upper position, as shown in dotted lines in FIGURE 11. A line 50 leads from the other side of the motor 21 to a contact 51 adapted to be engaged by the contact bar 44. A line 52 leads from the solenoid 42 to the first of the switches 33 represented by the digit 1 adjacent the drum 11. This switch is adapted to complete a circuit through a contact 53 and through a second contact 54. This switch is normally biased into engagement with contact 53 and is adapted to move to contact 54 when a physical indicium 23 on the drum 11 contacts it.

A line 55 leads from contact 53 to a contact 56 which is normally engaged by the first switch of the group of switches 32 on the movable disc 25 represented by the digit 1. A line 57 leads from contact 54 to a contact 60 which is adapted to be engaged by the last mentioned switch upon movement thereof by a physical indicium 31 on movable disc 25. The last mentioned switch has a line 61 leading therefrom to the second of the switches 33 represented by the digit 2. This switch is normally in engagement with a contact 62 and is adapted to engage a contact 63 upon movement thereof by a physical indicium 23 on the programmer drum 11.

The contact 62 has a line 64 leading therefrom to a contact 65 normally engaged by the second of the switches 32 on the movable disc 25 represented by the digit 2. The contact 63 has a line 66 leading therefrom to a contact 67 which is adapted to be contacted by the last mentioned switch upon movement thereof by a physical indicium 31 on the movable disc 25. The last mentioned switch has a line 70 leading therefrom to the third of the switches 33 on the programmer drum 11 represented by the digit 4. The last mentioned switch is normally in engagement with a contact 71 and is adapted to engage a contact 72 upon movement thereof by a physical indicium 23 on the programmer drum 11. The contact 71 has line 73 leading therefrom to a contact 74 which is normally engaged by the third of the switches 32 on the movable disc 25 represented by the digit 4.

The contact 72 has a line 75 leading therefrom to a contact 76 which is adapted to be engaged by the last mentioned switch upon movement thereof by a physical indicium 31 on the movable disc 25. The last mentioned switch has a line 77 leading therefrom to the fourth of the switches 33 on the programmer drum 11 represented by the digit 8. The last mentioned switch is normally in engagement with a contact 80 and is adapted to engage a contact 81 upon movement thereof by a physical indicium on the programmer drum 11. The contact 80 has a line 82 leading therefrom to a contact 83 normally engaged by the fourth of the switches 32 on movable disc 25 represented by the digit 8. The contact 81 has a line 84 leading therefrom to a contact 85 adapted to be engaged by the last mentioned switch upon movement thereof by a physical indicium 31 on the movable disc 25. The last mentioned switch has a line 86 leading therefrom to the fifth of the switches 33 on programmer drum 11 represented by the digit 16. The last named switch is normally in engagement with a contact 87 and is adapted to engage a contact 90 upon movement thereof by a physical indicium 23 on the programmer drum 11.

The contact 87 has a line 91 leading therefrom to a contact 92 normally engaged by the fifth of the switches 32 on movable disc 25 represented by the digit 16. The contact 90 has a line 93 leading therefrom to a contact 94 adapted to be engaged by the last mentioned switch upon movement thereof by a physical indicium 31 on the movable disc 25. The last mentioned switch has a line 95 leading therefrom to a contact 96 adapted to be engaged by the contact bar 45 when the solenoid relay 42 is energized.

The contact bar 45 is also in engagement with a contact 97 when the solenoid relay 42 is energized which has a line 100 leading therefrom to the switches 19 which are connected to the components of the dyeing machine. An example of this is shown at switch I which is electrically connected to a solenoid for controlling the drain valve I. The switches 19 have a line 101 leading therefrom to ground. The line 95 has a line 102 leading therefrom to a contact 103 which is adapted to be engaged by contact bar 46 when the solenoid relay 42 is deenergized and the shaft 43 is moved to the upper position by the spring 47. The contact bar 46 is also adapted to engage a contact 104 when it is in the raised position which has a line 105 leading therefrom and connected to the line 101 to lead to ground. The contact bar 44 is adapted to engage the contact 51 and a further contact 106 when the solenoid relay 42 is deenergized and the shaft 43 is in the upper position thereof. The contact 106 has a line 107 leading therefrom which leads to a contact 110 on the sixth of the switches 32 or the master control switch on the movable disc 25. This master control switch is normally in engagement with a contact 111 which is grounded and is adapted to engage contact 110 upon the movement thereof by a physical indicium 31 on the movable disc 25.

As seen in FIGURE 11, under normal conditions during the operation of a particular cycle of the dyeing machine 24 or before a sequence of cycles has begun, a primary circuit is completed by introducing electricity from the power source into the line 40 which will flow through the line 40 to the line 41 and into the solenoid relay 42 to energize same to hold the shaft 43 against the bias of the spring in its lower position, as shown in solid lines in FIGURE 11. It is noted that current will not flow through the motor 21 to operate same because the contact bar 44 is not in engagement with contacts 51 and 106 to complete the secondary circuit through motor 21.

From the solenoid relay 42 the electricity will flow through line 52, through the first of the switches 33 represented by the digit 1, through the contact 53 and line 55 to the contact 56, through the first of the switches 32 represented by the digit 1, through line 61 to the second of the switches 33 represented by the digit 2, through the contact 62 and the line 64 to the contact 65, through the second of the switches 32 represented by the digit 2, through the line 70 to the third of the switches 33 represented by the digit 4, through the contact 71 and line 73 to the contact 74, through the third of the switches 32 represented by the digit 4, through the line 77 to the fourth of the switches 33 represented by the digit 8, through the contact 80 and line 82 to the contact 83, through the fourth of the switches 32 represented by the digit 8, through the line 86 to the fifth of the switches 33 represented by the digit 16, through the contact 87 and line 91 to the contact 92, through the fifth of the switches 32 represented by the digit 16, through the line 95 to the contact 96 through the contact bar 45 to the contact 97, through line 100 to the switches 19, and through the line 101 to ground. This is the primary circuit and when completed will allow the switches 19 to actuate the components of the dyeing machine 24 and hold the programmer drum 11 stationary to permit the physical indicia 23 on the programmer drum 11 to contact the appropriate switches A through Z of switches 19.

When the movable disc 25 of the random access means rotates the desired distance in timed relationship to actuate another cycle, the physical indicia 31 on the disc 25 will engage the switches 32. If cycle 9, discussed above, is to be actuated, the switches 32 represented by the digits 1 and 8 will be engaged along with the master control switch, as may be seen in FIGURE 3. This action will move the switches 32 represented by the digits 1 and 8 and the master control switch from the respective contacts 56, 83 and 111 to the respective contacts 60, 85, 110. This movement will break the above described primary circuit at these contact points to deenergize the solenoid relay 42 and allow the spring 47 to raise the shaft 43 to the upper position, shown in dotted lines in FIGURE 11. A secondary circuit will now be completed by allowing electricity to flow through the line 40 from the power source, through the motor 21 to the line 50 and to the contact 51, through the contact bar 44, to the contact 106. The flow of electricity will continue from contact 106 through line 107 to contact 110, through the master switch on rotating disc 25, through the line 112 to line 101 and to ground. This secondary circuit which will cause actuation of the motor 21 and movement of the programmer drum 11 in the manner described above. It is noted that this secondary circuit does not lead to the switches 19 and therefore the switches 19 are not activated to actuate the components of the dyeing machine 24 regardless of any contact by physical indicia 23 on programmer drum 11.

The programmer drum 11 will continue to rotate due to the above described secondary circuit until the physical indicia 23 in the last five circumferential rows of programmer drum 11 come into engagement with the corresponding switches 33 representing the digits 1 and 8.

When this happens the switches 33 representing the digits 1 and 8 will move from the respective contact 53 and 80 to the respective contacts 54 and 81, as shown in dotted lines, FIGURE 11. This will again complete the primary circuit by allowing the electricity to flow through the secondary line 57 and 84 and through the line 102, contact 103, contact bar 46, line 105, and line 101 to ground. The completion of this circuit will energize the solenoid relay 42 to move the shaft 43 against the bias of the spring 47 to the lower position, illustrated in solid lines in FIGURE 11. When this happens the contact bar 44 will not be in engagement with the contacts 51 and 106 and the secondary circuit will be broken through the motor 21 to stop operation thereof and stop the movement of the programmer drum 11.

As may be seen in FIGURE 10, a simple dyeing operation for the dyeing machine 24 is shown programmed on the disc 25. The radial lines of apertures shown on that drawing represent five minute intervals of rotation of the disc 25 and the time required for this operation is four hours; therefore, two of these operations are shown programmed. The first cycle desired to be actuated is the fill cycle or cycle number 1 and therefore a physical indicium 31 is placed in the aperture representing the digit 1 and in the aperture for the master control. The next cycle desired is the add tank 1—⅓ cycle or cycle number 17. It is desired to program this cycle five minutes away from the previous cycle and therefore a physical indicium 31 is placed in the next succeeding radial line in the apertures represented by the digit 1 and the digit 16 and in the master control aperture. It is next desired to actuate the drain cycle or cycle number 3 twenty minutes later. Therefore, physical indicia 31 are placed in the fourth succeeding radial line in the apertures represented by the digits 1 and 2 and in the master control aperture. It is next desired to repeat the fill cycle or cycle number 1 five minutes later. Therefore, physical indicia 31 are placed in the next succeeding radial line in the aperture represented by the digit 1 and in the master control aperture.

It is desired to next program the add tank 2—⅔ cycle or cycle number 21 five minutes later. Therefore, physical indicia 31 are placed in the next succeeding radial line in the apertures represented by the digits 1, 4, 16 and in the master control aperture. The next cycle to be programmed is the drain cycle or cycle number 3 three hours later. Therefore, physical indicia 31 are placed in the thirty-sixth succeeding radial line in the apertures represented by the digits 1 and 2 and in the master control aperture. The next cycle to be programmed is the fill cycle or cycle number 1 five minutes later. Therefore, physical indicia are placed in the next succeeding radial line in the aperture represented by the digit 1 and in the master control aperture. The next desired cycle is the top wash cycle or cycle number 2 five minutes later. Therefore, physical indicia 31 are placed in the next succeeding radial line in the aperture represented by the digits 2 and in the master control aperture. The last cycle desired to be actuated is the drain cycle or cycle number 3 twenty minutes later. Therefore, physical indicia are placed in the fourth succeeding radial line in the aperture represented by the digit 8 and in the master control aperture. Thus it may be seen, that the desired cycles of a simple dyeing machine operation may be easily and quickly programmed on the random access disc 25 to control the sequence and number of cycles actuated by the programmer drum 11 to control the dyeing machine operation.

From the above description it may be seen that this invention has provided a random access means for controlling and moving a programmer to control the sequence and number of cycles of a dyeing machine actuated by the programmer independently of the sequence of arrangement of such cycles on the programmer and in which all of the possible cycles of the dyeing machine may be programmed on the programmer without regard to sequence.

As previously noted, the invention is not limited to dyeing machines and the random access means and programmer may be used for programming and controlling any desired operation. The term cycle as used herein is meant to include a step, operation or function in a series of steps, operations or functions and is not meant to imply any particular duration for the cycle, step, operation or function.

In the drawings and specification there has been set forth a preferred embodiment of the invention and, although specific terms are employed, they are used in a generic and descriptive sense only and not for purposes of limitation, the scope of the invention being defined in the claims.

What is claimed is:

1. The combination of a movable programmer having physical indicia thereon arranged in a predetermined manner, a first group of switches associated with said programmer and operated by said physical indicia on said programmer to actuate a plurality of cycles in any desired operation, and random access means for controlling and moving said programmer to control the sequence and desired repeats of cycles actuated by said physical indicia on said programmer independently of the sequence of arrangement of said physical indicia on said programmer; said random access means comprises movable means having physical indicia thereon, a second group of switches associated with said movable means and operated by said physical indicia on said movable means, motor means actuated by said second group of switches to move said programmer, and a third group of switches associated with said programmer and cooperating with said second group of switches and operated by said physical indicia on said programmer to stop said motor means and said programmer at the desired location to allow said first group of switches to be operated by said physical indicia on said programmer to actuate the desired cycle in the operation.

2. The combination, as set forth in claim 1 in which said physical indicia on said movable means is movable to change the control and movement of said programmer to change the sequence of cycles in the operation actuated by said physical indicia on said programmer.

3. The combination, as set forth in claim 1, in which said movable means comprises a circular disc mounted to be rotated in timed relationship to said second group of swtiches, said physical indicia on said circular disc being arranged in a predetermined manner along radial axes on said disc for operating certain of said second group of switches at various time intervals to actuate said motor means to move said programmer, and certain of said physical indicia on said programmer being arranged in corresponding predetermined manner to said physical indicia on said disc for operating certain of said third group of switches to stop the movement of said motor means and said programmer at the desired location of said programmer.

4. The combination of a movable programmer having physical indicia thereon arranged in a predetermined manner and adapted to initiate all of the cycles in a particular machine operation, and electro-mechanical random access means having physical indicia thereon for controlling said movable programmer to control the sequence and number of cycles initiated by said programmer independently of the sequence of arrangement of said physical indicia on said programmer; said random access means comprises movable means having said physical indicia thereon, a group of switches associated with said movable means and operated by said physical indicia on said movable means, motor means actuated by said group of switches associated with said movable means to move said programmer, and a group of switches associated with said programmer and cooperating with said group of switches associated with said movable means and operated by said physical indicia on said programmer to stop said motor means and said programmer at the desired location to actuate the desired cycle in the operation; said movable means comprises a circular disc mounted to be rotated in timed relationship to said group of switches associated therewith; said physical indicia on said circular disc being arranged in a predetermined manner along radial axes on said disc for operating certain of said switches associated therewith to actuate said motor means to move said programmer; and certain of said physical indicia on said programmer being arranged in corresponding predetermined manner to said physical indicia on said disc for actuating certain of said switches associated with said programmer to stop movement of said motor means and said programmer at the desired location of said programmer.

5. The combination of a textile dyeing machine having a plurality of valve means and control means for operating the various cycles of said machine in the dyeing of textile material, a movable programmer having physical indicia thereon arranged in a predetermined manner, a first group of switches associated with said programmer and operatively connected with said valve means and said control means on said dyeing machine and adapted to be operated by said physical indicia on said programmer to actuate the various cycles of said textile dyeing machine, and random access means for controlling and moving said programmer to control the sequence of cycles of said dyeing machine actuated by said physical indicia on said programmer independently of the sequence of arrangement of said physical indicia on said programmer; said random access means comprises movable means having physical indicia thereon, a second group of switches associated with said movable means and operated by said physical indicia on said movable means, motor means actuated by said second group of switches to move said programmer, and a third group of switches associated with said programmer and cooperating with said second group of switches and operated by said physical indicia on said programmer to stop said motor means and said programmer at the desired location to allow said first group of switches to be operated by said physical indicia on said programmer to actuate the desired cycle in said textile dyeing machine.

6. The combination, as set forth in claim 5, in which said physical indicia on said movable means is movable to change the control and movement of said programmer to change the sequence of cycles of said dyeing machine actuated by said physical indicia on said programmer.

7. The combination, as set forth in claim 5, in which said movable means comprises a circular disc mounted to be rotated in timed relationship to said second group of switches, said physical indicia on said circular disc being arranged in a predetermined manner along radial axes on said disc for operating certain of said second group of switches at various timed intervals to actuate said motor means to move said programmer, and certain of said physical indicia on said programmer being arranged in corresponding predetermined manner to said physical indicia on said disc for operating certain of said third group of switches to stop movement of said motor means and said programmer at the desired location of said programmer.

8. The combination of a textile dyeing machine having a plurality of valve means and control means for operating the various cycles of said machine in the dyeing of textile material, a movable programmer associated with said textile dyeing machine and having physical indicia thereon arranged in a predetermined manner and adapted to initiate all of the possible cycles of said textile dyeing machine, and electro-mechanical random access means having physical indicia thereon for controlling said movable programmer to control the sequence and number of cycles of said dyeing machine initiated by said programmer independently of the sequence of arrangement of said physical indicia on said programmer; said random access means comprises movable means having said physical indicia thereon, a group of switches associated with said movable means and operated by said physical indicia on said movable means; motor means actuated by said group of switches associated with said movable means to move said programmer, and a group of switches associated with said programmer and cooperating with said group of switches associated with said movable means and operated by said physical indicia on said programmer to stop said motor means and said programmer at the desired location to actuate the desired cycle in said dyeing machine operation; said movable means comprises a circular disc mounted to be rotated in timed relationship to said group of switches associated therewith; said physical indicia on said circular disc being arranged in a predetermined manner along radial axes on said disc for operating certain of said switches associated therewith to actuate said motor means to move said programmer; and certain of said physical indicia on said programmer being arranged in corresponding predetermined manner to said physical indicia on said disc for actuating certain of said switches associated with said programmer to stop movement of said motor means and said programmer at the desired location of said programmer.

9. The combination of a movable programmer having physical indicia thereon arranged in a predetermined manner and adapted to initiate all the possible cycles in a particular machine operation, movable electro-mechanical random access means adapted to move independently of said programmer and having physical indicia thereon for controlling said movable programmer to control the sequence and number and desired repeats of cycles initiated by said programmer independently of the sequence of arrangement of said physical indicia on said programmer, activating means operated by said physical indicia on said movable random access means, drive means actuated by said activating means to move said programmer, and deactivating means operated by said physical indicia on said programmer and cooperating with said activating means to stop said drive means and thus said programmer at the desired location irrespective of the starting position of said programmer for any cycle.

10. The combination, as set forth in claim 9, in which said activating means comprises a first group of switches mounted adjacent said random access means and selected ones of which are operated during each cycle by said physical indicia on said random access means, and in which said deactivating means comprises a second group of switches each of which operably corresponds with a particular switch of said first group and are mounted adjacent said programmer and are operable to stop said drive means when selected ones thereof corresponding to the previously operated switches of said first group have been operated.

11. The combination of a textile dyeing machine having a plurality of valve means and control means for operating the various cycles of said dyeing machine in the dyeing of textile material, a movable programmer having physical indicia thereon arranged in a predetermined manner and adapted to actuate said valve means and said control means for the various cycles in said dyeing machine, movable electro-mechanical random access means adapted to move independently of said programmer and having physical indicia thereon for controlling said movable programmer to control the sequence and number and desired repeats of cycles actuated by said programmer independently of the sequence of arrangement of said physical indicia on said programmer, activating means operated by said physical indicia on said movable random access means, drive means activated by said activating means to move said programmer, and deactivating means operated by said physical indicia on said programmer and cooperating with said activating means to stop said drive means and thus said programmer at the desired location irrespective of the starting position of said programmer for any cycle.

12. The combination, as set forth in claim 11, in which said activating means comprises a first group of switches mounted adjacent said random access means and selected ones of which are operated during each cycle by said physical indicia on said random access means, and in which said deactivating means comprises a second group of switches each of which operably corresponds with a particular switch of said first group and are mounted adjacent said programmer and are operable to stop said drive means when selected ones thereof corresponding to the previously operated switches of said first group have been operated.

References Cited by the Examiner
UNITED STATES PATENTS

| | | | |
|---|---|---|---|
| 2,225,350 | 12/1940 | Rankin | 68—12 X |
| 3,101,435 | 8/1963 | Welch et al. | 307—141.4 X |
| 3,188,504 | 6/1965 | Anderson | 307—141.4 |
| 3,198,967 | 8/1965 | Roberts | 307—141.4 |

WILLIAM I. PRICE, *Primary Examiner.*